May 21, 1935.  J. L. ANDERSON  2,002,073

TEMPLATE

Filed Aug. 13, 1932  2 Sheets-Sheet 1

INVENTOR
James L. Anderson
BY
J. F. Lindenberg
ATTORNEY

May 21, 1935.   J. L. ANDERSON   2,002,073
TEMPLATE
Filed Aug. 13, 1932   2 Sheets-Sheet 2
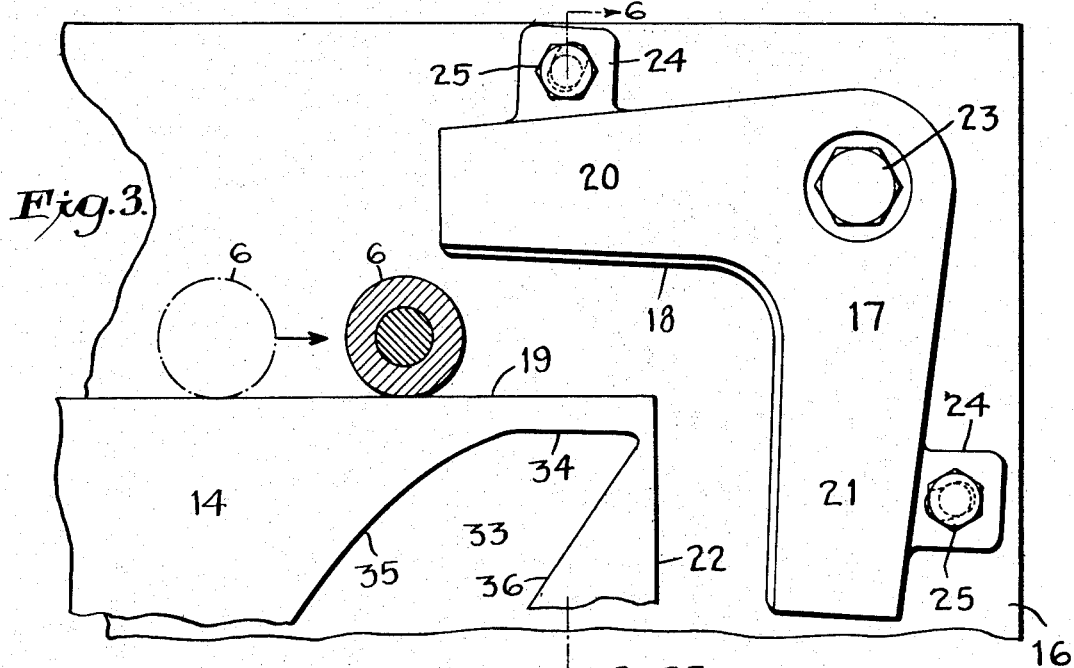
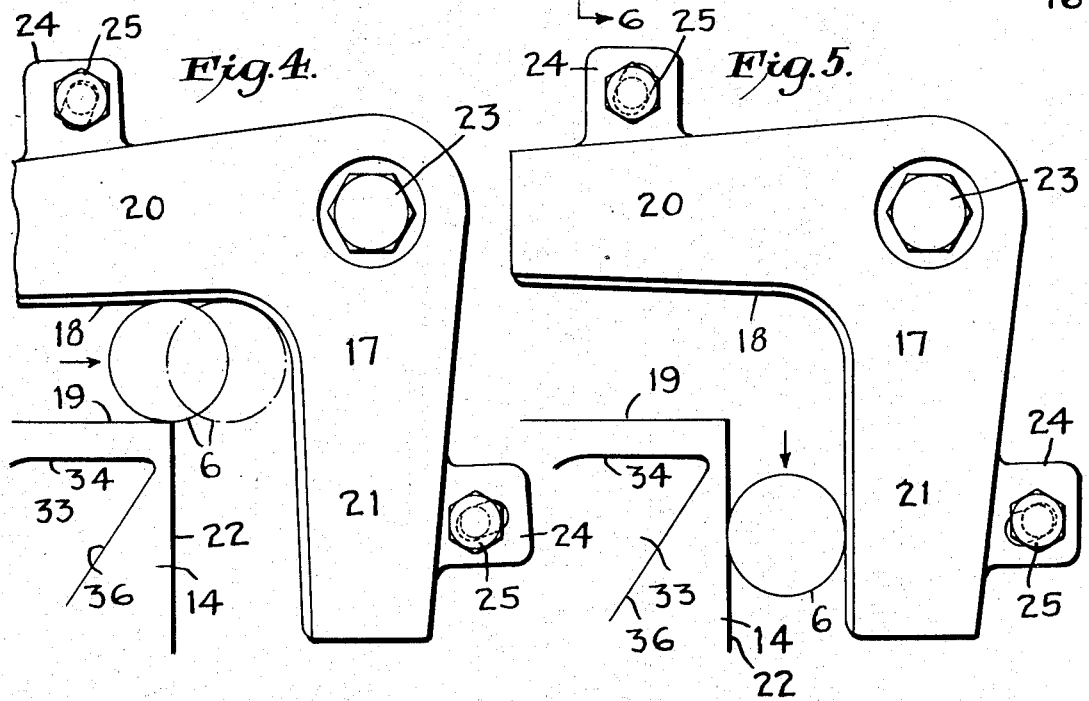

Patented May 21, 1935

2,002,073

UNITED STATES PATENT OFFICE 2,002,073

TEMPLATE

James L. Anderson, Closter, N. J., assignor to Air Reduction Company, Incorporated, New York, N. Y., a corporation of New York Application August 13, 1932, Serial No. 628,662

9 Claims. (Cl. 33—25)

The invention relates to template-controlled apparatus of the kind in which a cutting torch or other instrumentality carried by a suitable frame or support is moved at uniform speed in any and changing directions by a motor-driven electromagnetic follower or tracer cooperating with the external or internal boundary of a template of paramagnetic material.

Specifically, the invention has to do with an improved template for guiding a magnetic follower of the kind disclosed in Patent 1,839,170, issued on an application of Fred E. Rogers and myself, said follower having upper and lower magnet rollers, driven in opposite directions, which cooperate respectively, and at different times, with external and internal template portions.

While the utility of such tracers and templates is not necessarily restricted to torch apparatus or to cutting by means of an oxygen jet or welding by means of a high temperature flame jet, these, and more especially torch cutting of metal, are the principal or contemplate fields of application. Considering the case of a universal cutting machine, it will be understood that the torch is to be so moved that the path of movement of its cutting jet reproduces the path of the axis of the magnetic tracer roller, the reproduction being at a one to one ratio or at other ratio, and direct or in reverse, depending upon the particular character of the reproduction frame, carriages or linkage, a variety of which are well known.

The particular problem is to make it possible to cause the controlled instrumentality to execute abrupt or sharp angular turns in any direction, or turns of any desired small radius of curvature. Internal corners or angles are easy to reproduce, since it is necessary only to form the internal corner of the template on a radius of curvature but slightly greater than the radius of the magnetic roller. Then the axis of the roller will experience a virtually sharp change in direction of translation, and the cutting jet, if the operation be one of cutting, will execute a corresponding movement, so that a corner to all intents and purposes angular, or of very slight radius of curvature, will be cut. If the roller is called upon to negotiate an external corner of the template, however, while in contact therewith, it will be evident that the radius of the shortest curve that can be described will be the radius of the roller, with the result that a definitely rounded corner only can be cut, in addition to which the movement of the axis of the roller and of the cutting jet will be so accelerated that the cut may be lost.

Automatic fingers have been successfully used in connection with the templates of magnetic tracer cutting machines to overcome this difficulty, but the provision of such fingers is not always convenient. This is more especially true when the magnetic tracer is inverted, that is to say has its roller at the lower end, and the template, which may support the weight of the tracer, rests upon a bed.

With the apparatus of the prior patent referred to, sharp corners of all kinds could be traced and cut without the use of automatic fingers. One of the two rollers cooperates with the edge face of the main template, which may be formed with any number of internal corners, the second roller turning idly in space until the region of an external corner is reached. There an internal corner template piece is provided, which takes control, in cooperation with the second roller, the first roller then turning idly, until this corner is turned, whereupon the first roller again rolls in contact with the main template, to which the guidance or control is restored. This plan has proved very successful and permits the tracing of practically any design that can be drawn. It was necessary, however, to set the extra internal corner template piece or pieces with great accuracy, which was troublesome and took time; otherwise the cut might exhibit a jog where the tracer jumped laterally from one template track to the other, or the movement might be stopped because of the setting being too close.

The object of this invention is to provide a decided improvement upon the subject-matter of the patent aforesaid, though within the general scope thereof, whereby all the advantages of the matters covered by the patent are preserved and the necessity for very accurate setting of the auxiliary template piece is avoided. This is accomplished by making the auxiliary or "internal" template piece movable to the extent that it will be shifted slightly by the magnetic force, that is to say sufficiently so that guidance will be transferred from one template to the other and back again, as the magnetic tracer approaches and leaves the corner or turn, without any undesired jog in the path of translation movement, and without any danger of blocking the movement. Otherwise, the auxiliary or internal template piece serves in the same way as the internal template piece of the patent.

In order to facilitate the transfer of control from one template and roller to the other template and roller, and to insure uninterrupted motion when the change in direction is executed, it is advisable to provide means for weakening the attraction between the main template and its roller at the region where the other roller is to travel on the internal template piece. In the aforesaid patent, an insert of diamagnetic material was set into the face of the external corner region of the main template. Another object of the present invention is to provide a simpler and more effective way of accomplishing the result. I do this by reducing the amount of material in the external corner region of the main template, and preferably by providing a cut-out in the interior of this template portion, this cut-out being adjacent the turn and being of predetermined shape and size to cause the attraction between the main template and its roller to weaken as the follower approaches the turn and to become stronger again after the follower passes the turn.

In the accompanying drawings, forming part hereof:

Fig. 3 is a plan view, on a larger scale, of a portion of the template sufficient to illustrate the invention, one of the magnetic rollers being shown in horizontal section rolling on the boundary of the external template and approaching the internal template;

Fig. 4 is a similar view, showing the condition when the follower has proceeded somewhat farther in this course;

Fig. 5 is a similar view showing the condition after the follower has made the turn; and Fig. 6 is a section on the line 6—6 of Fig. 3.

Figure 1:
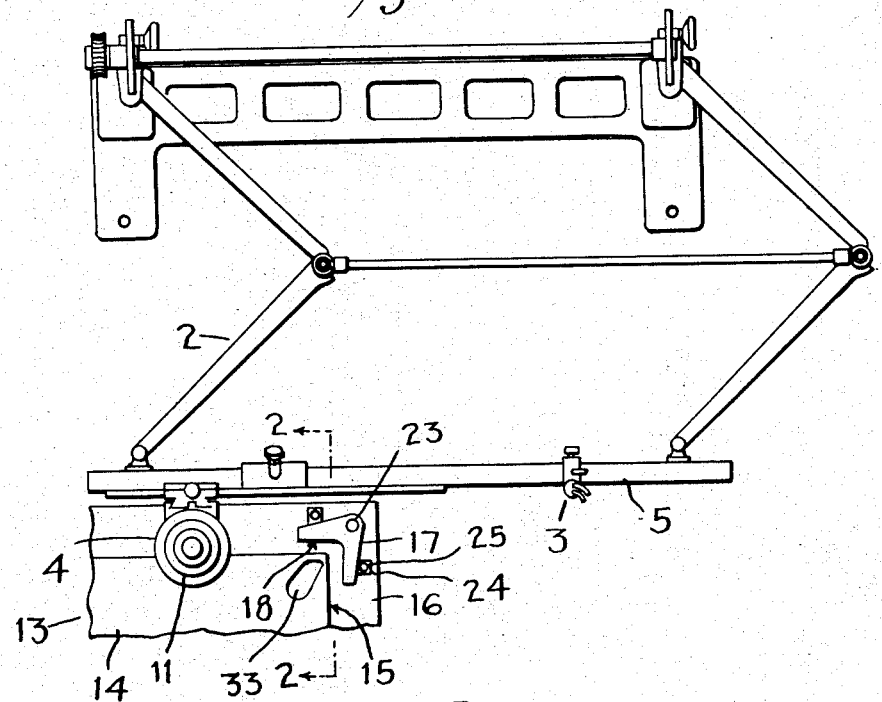
Fig. 1 is a plan view of a universal torch machine, together with a portion of a template embodying the invention.
Figure 2:
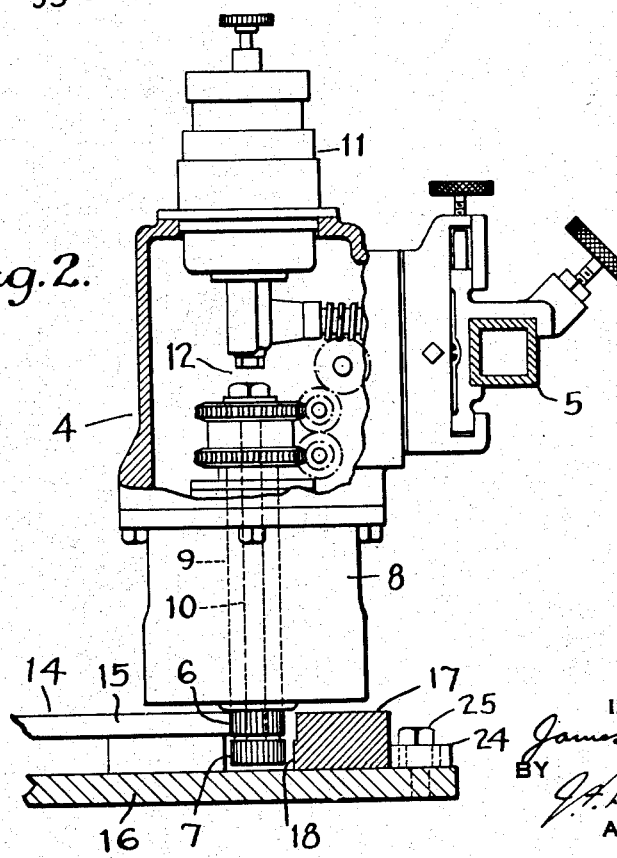
Fig. 2 is a section taken on the line 2—2 of Fig. 1, a part of the casing of the follower being broken out.

The frame 2 of known type shown in Fig. 1 is representative of any suitable form of universal-motion, or motion-reproducing, frame, of which various kinds are known. A cutting torch 3 and a follower 4 mounted on the front bar 5 of the jointed frame are movable in all directions in a plane, more especially a horizontal plane, and in this particular form of apparatus the movements of the follower and of the controlled instrumentality are substantially the same in direction and in speed, but this is not essential.

The follower 4, like that disclosed in Patent 1,839,170, has two coaxial rollers 6, 7, constituting a polar projection of an electromagnet, the coil of which is housed in a casing 8. The rollers are on the ends of coaxial shafts 9 and 10, which are driven in opposite directions by an electric motor 11 through gearing 12.

A portion of a template 13 to guide the follower is shown in Fig. 1. A corner is to be traced by the axis of the rollers 6, 7, and is to be reproduced in the cutting of the metal (not shown) by the action of the oxygen jet of the torch 3. The purpose of the present improvement is to facilitate operations in which abrupt changes of direction, or sharp corners, are required.

The cutting of a design having internal and external angles may be considered as the example. It may be assumed that, throughout most of the course, the follower is guided by a main template 14, the boundary 15 of which constitutes a track to which the upper magnetized roller 6 strongly adheres, thereby securing the traction for driving the apparatus. This template may be of any configuration, and may have as many internal turns as the design to be cut may call for. It may be fastened to a suitable bed 16, or may rest on the bed without fastening, and, if supported on a bed, is either undercut or blocked up so that the lower magnetized roller 7 turns idly except at an external corner region, where it coacts with an "internal" template piece 17. There will be one or more of these auxiliary templates, depending upon the number of external corners to be negotiated. In other words, wherever the follower or tracer would otherwise be called upon to turn an external corner of the main template, an internal template piece 17 is provided.

The template piece 17 has an internal boundary or surface 18 affording a track for the roller 7, the planes between which this track is included being offset from the planes between which the main track 15 is included. The track 18 comprises two portions in angular relation to each other, spaced outwardly from the template 14, and connected by a curve the radius of which will be determined by the degree of abruptness with which the direction of movement is to be changed. If the radius of this curve is made only slightly greater than the radius of the roller 7, the cut which is made by the torch will possess a virtually sharp corner, whereas if the apparatus were guided at this region by the roller 6 turning the external corner of the template 14, the corner of the cut would be made on a curve corresponding approximately to the radius of the roller. The template piece 17 is preferably made in the form of an elbow, though obviously its external configuration is unimportant. The internal surface is so formed and so spaced from the template 14, or, conversely, the external surface of the template 14 is so formed and so spaced from the internal template piece 17, that the roller 6 is free of magnetic or traction contact with the template 14 while the roller 7 makes the turn in magnetic traction contact with the piece 17.

With a fixed, or stationary, internal template piece, as disclosed in Patent 1,839,170, the setting of the template must be very exact. In the present invention, that difficulty is overcome by mounting the template piece 17 so that it can be shifted automatically and slightly by the magnetic effect. For purpose of illustration, the shaping, and the extent of movement of the template piece 17, have been somewhat exaggerated in the drawings.

In Fig. 3 we see the roller 6 traveling along a side 19 of the template 14 toward the turn. The "arriving" limb 20 of the internal template piece 17 (we may speak, for convenience, of this piece as having two limbs) which overlaps this side of the external template, is inclined somewhat away from the template 14, whereas the "departing" limb 21 is inclined somewhat toward the side 22 of the template 14. The roller 7, beneath the roller 6 and preferably of the same diameter, clears the template piece 17 as it enters. Presently, as the follower proceeds, the magnetic attraction draws this limb of the template piece 17 to the roller 7. The roller 7 secures traction on the template piece 17 and soon carries the roller 6 beyond the end of the side 19 of the template 14, as shown by the broken line circle in Fig. 4. The roller 7 rolls in the curve of the track 18 of the internal template piece and proceeds along the limb 21, until, very shortly, the magnetic attraction draws this limb and the rollers toward the side 22 of the template 14, bringing the roller 6 into contact therewith. This condition is represented in Fig. 5. Then the roller 6 proceeds along the side 22 and carries the roller 7 away from the end of the limb 22. After these things have taken place, the limb 20 is again inclined sufficiently away from the side 19 of the external template 14 to allow free entrance of the roller 7 when the follower travels again through the same course as before.

By virtue of the mounting of the piece 17 which permits it to shift in the general manner described, the path of the axis of the rollers, and consequently the path of the oxygen jet of the cutting torch, will contain no offset or jog such as would result from the follower leaping laterally from one guide to the other. On the other hand, the piece 17 will not block the movement of the follower, as it might do if it were a stationary part set a little too close to the main template.

The template device 17 need not necessarily consist of a single member, and the mounting which enables it to shift so that control is transferred from one template to the other and back again, without stoppage and without jog, can be contrived in a variety of specifically different ways which will suggest themselves to the skilled mechanic. The simplest and most convenient construction is one in which the internal template device 17 consists of a single piece and is turnable through a small angular displacement about a pin or screw 23 fastened to a suitable support, such as the bed 16. As shown, this center passes through the apical portion of the template piece. However, the invention is not limited to a pivoting of the auxiliary or internal template piece, since it may be movable in a more or less bodily manner. Again, the internal template device could be constituted of two independently movable parts. The piece should not move too freely, for which reason the screw 23 is preferably turned down fairly tight, so that the shiftable template piece will remain frictionally held in any position in which it is left. The movement of the template piece could be made free as far as fastenings are concerned and be resisted by other means tending to keep it in positions of rest. For further security, the piece 17 may be provided with slotted lugs 24, through which other screws 25 pass into the bed.

Instead of, or in addition to, friction or resistance obtained by fastenings or other mechanical means, to keep the auxiliary template piece in proper position until it should move, sufficient weight in this piece may be relied upon. Again, if the bed 16 is of paramagnetic material, the piece 17 will be held in position magnetically when in the field of the tracer magnet, but will nevertheless slip and adjust itself by reason of the attraction between the magnetic pole and the fixed and movable template parts.

In order to weaken the attraction between the roller 6 and the template 14 as the follower approaches the turn and the roller 7 and the template 17 assume the driving and guiding functions, so that the roller 6 will leave its track 15 and not seek to pull the follower around the corner on the template 14, but will permit the roller 7 to do the driving and guiding at this time in contact with the piece 17, I make the cut-out or recess 33 in the interior of the template 14. It will be observed that the side 34 of this opening is close to the external side 19 of the main template, at the region near the corner where it is overlapped by the limb 20 of the shiftable piece 17, and that its sides 35 and 36 go off diagonally, so that the attraction between the roller 6 and the template 14 becomes less strong and then decidedly weak as the point where the direction is to be changed is closely approached, and then becomes progressively stronger after the change of direction has been effected and the template 14 is again to control the movement. The specific shape, size, location and configuration of this cut-out will naturally depend upon the kind of corner to be negotiated and upon other factors, such as the thickness of the templates, and can not, therefore, be more precisely defined, but the proper cut-out to make can be easily ascertained in any particular instance. Instead of an actual cut-out through the template 14, the mass of paramagnetic material in this part may be reduced by thinning or recessing or otherwise, to secure the same effect in substantially the same way.

It will be understood that the term "internal template device" signifies a paramagnetic template element or elements providing an internal corner, turn or deflection, to cooperate with one of the magnetic rollers opposite a region where there is or would be an external corner or turn of the template with which the other roller cooperates in other parts of the course. The corners to be cut may be right-angular, obtuse or acute. It will be evident, also, that the internal template devices may be shaped to cause the roller axis and, therefore, the torch jet, to trace a curve of any curvature that could not be satisfactorily traced by rolling contact of one of the rollers with an external angle or curve of the main template.

It will be understood that the construction and arrangement may be varied in numerous details. The invention is applicable to the cutting or welding of metals with oxy-fuel-gas torches or by other methods, and may be applied to still other purposes.

I claim:

1. Template means for guiding a follower having upper and lower magnet rollers driven in opposite directions, said means having, in addition to a template of magnetic material to cooperate with one of the rollers, an internal template device, also of magnetic material, to cooperate with the other roller to effect a desired change in direction, and means for supporting said internal template device so that it can be shifted slightly by the magnetic attraction between the rollers and the guiding portions, to insure transfer of the control of the follower from one template element to the other without jog or stoppage.

2. Template means as set forth in claim 1, in which the internal template device is fastened to turn on a center.

3. Template means as set forth in claim 1, in which by mechanical means the internal template device is held frictionally.

4. Template means as set forth in claim 1, in which the internal template device is held in position magnetically.

5. Template means as set forth in claim 1, in which the internal template device is fastened to turn on a center against substantial frictional resistance.

6. Template means for guiding a follower having upper and lower magnet rollers driven in opposite directions, said means having, in addition to a template of magnetic material to cooperate with one of the rollers, an internal template device, also of magnetic material, at said region to cooperate with the other roller to effect a desired change in direction, said internal template device being movable so as to be shiftable by the magnetic attraction between the rollers and the guiding portions, to insure transfer of the control of the follower from one template element to the other without jog or stoppage, the first-mentioned template having a reduction of its mass adjacent the region of the change of direction to secure predetermined change in the attraction between this template and the corresponding roller at this region.

7. Template means as set forth in claim 6, wherein the first-mentioned template has a cut-out in its interior adjacent the region of the change of direction to secure predetermined change in the attraction between this template and the corresponding roller at this region.

8. Template means for guiding a follower having upper and lower magnet rollers driven in opposite directions, said means comprising a template of magnetic material adapted to cooperate with one of the rollers through part of the prescribed course and an internal template device, also of magnetic material to cooperate with the other roller to effect a sharp change in direction, the first-mentioned template having means, consisting solely of a reduction of its mass adjacent the region of the change of direction, for securing predetermined gradual change in the attraction between this template and the corresponding roller at this region, the reduction in mass of the first-mentioned template being accomplished by means of a cut-out in its interior adjacent the region of the change of direction to secure predetermined change in the attraction between this template and the corresponding roller at this region.

9. Template means for guiding a follower having upper and lower magnet rollers driven in opposite directions, said means having, in addition to a template of magnetic material to cooperate with one of the rollers, an auxiliary template device, also of magnetic material, to cooperate with the other roller to effect a desired change in direction, and means for holding said auxiliary template device in position with sufficient freedom to move and adjust itself under magnetic attraction.

JAMES L. ANDERSON.